United States Patent [19]

Bates et al.

[11] Patent Number: 5,352,744
[45] Date of Patent: Oct. 4, 1994

[54] METHOD FOR HYDROGENATING POLYMERS AND PRODUCTS THEREFROM

[75] Inventors: Frank S. Bates, St. Louis Park; Mark D. Gehlsen, Eagan, both of Minn.; Vincent L. Hughes, Humble; Patrick Brant, Seabrook, both of Tex.

[73] Assignee: University of Minnesota, St. Paul, Minn.

[21] Appl. No.: 31,460

[22] Filed: Mar. 15, 1993

[51] Int. Cl.⁵ ............................................. C08F 8/04
[52] U.S. Cl. ................................ 525/339; 525/332.8; 525/332.9; 525/333.1; 525/333.2; 525/333.3; 525/338
[58] Field of Search .......................... 525/338, 339

[56] References Cited

U.S. PATENT DOCUMENTS

| | | |
|---|---|---|
| 3,062,800 | 11/1962 | Dissen . |
| 3,333,024 | 7/1967 | Haefele . |
| 3,431,323 | 3/1969 | Jones . |
| 3,629,371 | 12/1971 | Winkler . |
| 3,809,687 | 5/1974 | Allison, Jr. et al. .................. 525/338 |
| 4,946,899 | 8/1990 | Kennedy et al. . |

FOREIGN PATENT DOCUMENTS

| | | |
|---|---|---|
| 781668 | 12/1968 | Belgium . |
| 1131885 | 6/1962 | Fed. Rep. of Germany . |
| 1131886 | 6/1962 | Fed. Rep. of Germany . |
| 1575046 | 7/1969 | France . |
| 621635 | 6/1961 | Italy . |
| 863256 | 3/1961 | United Kingdom . |
| 889591 | 2/1962 | United Kingdom . |
| 1020720 | 2/1966 | United Kingdom . |
| 1020790 | 2/1966 | United Kingdom . |

OTHER PUBLICATIONS

"Hydrogenated Linear Block Copolymers . . . " Mohajer and Wilkes, et al. Polymer, 1982, vol. 23, Sep., pp. 1523-1535.

Thermo Plastic Elastomers, A Comprehensive Review, ed. Legge, et al. Ch. 14, pp. 506-540, Hanser Publishers, N.Y. 1987.

*Primary Examiner*—Bernard Lipman
*Attorney, Agent, or Firm*—Catherine L. Bell

[57] ABSTRACT

This invention relates to a method for hydrogenation of poly(alkenyl aromatic) polymers or poly(alkenyl aromatic)/polydiene block copolymers that provides hydrogenated polymers with 99.5% or greater unsaturation and an MWD of less than about 3. Hydrogenated polymers and adhesives comprising the hydrogenated polymers and tackifier are also provided.

14 Claims, 1 Drawing Sheet

METHOD FOR HYDROGENATING POLYMERS AND PRODUCTS THEREFROM

FIELD OF THE INVENTION

This invention relates to unsaturated polymers, methods for hydrogenating unsaturated polymers and applications using the hydrogenated polymers.

BACKGROUND OF THE INVENTION

Block copolymers are generally thought to be polymeric chains containing alternating segments or "blocks" of homopolymers or copolymers where each block differs materially from the adjacent block. Block copolymers may be di-block copolymers such that blocks of (A) alternate with blocks of (B) along the polymer chain or they may be multiblock copolymers wherein blocks of two different polymers are present in the polymer chain in alternate or an ABA configuration. An ABA tri-block unit is one where the first polymer A is present on either side of second polymer B creating a repeating three block sequence.

Some of the more versatile block copolymers known in the art are styrene-isoprene-styrene, (SIS) and styrene-butadiene-styrene (SBS) triblock copolymers. In general, block copolymers have either elastomeric or thermoplastic elastomeric qualities and are used in a wide variety of applications. Block copolymers may be subject to various modification or functionalization reactions to improve or alter their properties. One of the reactions which may be performed on some of these block copolymers is a hydrogenation reaction wherein the unsaturations within the blocks are removed. For example, in a styrene-isoprene-styrene block copolymer a homogeneous catalyst may be utilized to selectively hydrogenate the unsaturations in the isoprene to produce what is essentially an ethylene propylene block while leaving the styrene blocks saturated. This particular configuration has found many uses and is known commercially as KRATON G. ™

Hydrogenation of the isoprene and the polystyrene blocks in a multiblock copolymer has also been reported in the art. U.S. Pat. No. 3,333,024 to Haefele discloses that a styrene-isoprene-styrene block copolymer having a combined styrene content of 22% by weight can be hydrogenated by suspending the block copolymer in cyclohexanes and contacting it with a catalyst of nickel on kieselguhr at a pressure of 500 psig and at a temperature of 145°–55° C. for thirteen hours. The resulting hydrogenated block copolymer had 98% hydrogenation of the polystyrene blocks. The block copolymers were reported to have improved tensile properties over the unhydrogenated block copolymers, However, in Chapter 14 of Thermoplastic Elastomers, a comprehensive review, Ed. N. R. Legge, et al., Hanser Publishers, New York, 1987, this class of hydrogenated block copolymers was described as being generally poor. These hydrogenated materials are generally described as having an interaction parameter so severely reduced that at only slightly elevated temperatures the polymer loses all strength and appears to be homogeneous mixture. Thus, the good tensile strength of U.S. Pat. No. 3,333,024 appears to be limited to a low temperature end use range.

The hydrogenation of polymers is a known technique. There are two typical techniques, homogeneous and heterogeneous that have been shown effective for obtaining saturated polymers. Homogeneous hydrogenation yields high conversions, however, this method sometimes causes chain scission and often leads to metal contamination due to a catalyst extraction difficulties. Heterogeneous hydrogenation yields high conversions and in certain cases is more tractable than homogeneous hydrogenation due to minimal chain scission and no metal contamination and the ease of catalyst extraction. Furthermore, supported heterogenous transition metal catalysts are recyclable with no byproducts unlike homogeneous extraction products which generate large amounts of waste product. Heterogeneous hydrogenation has been used to saturate many types of polydienes including 1,4 and 3,4-poly(isoprene) and 1,2 and 1,4-polybutadiene. (Zhongde, X; et al., Macromolecules, 1983, 16, 925.)

Thus, hydrogenated block copolymers having good end-use properties such as high order/disorder transition temperatures, ($T_{ODT}$) or high glass transition temperatures (Tg's) and methods to make them are desirable.

SUMMARY OF THE INVENTION

This invention relates to a method for hydrogenating polymers comprising contacting the copolymer with a metal catalyst on an alkaline metal salt support. This invention further relates to hydrogenated polymers having greater than 99.5% saturation and a molecular weight distribution (Mw/Mn) of less than about 3, preferably less than about 2, even more preferably less than about 1.5. In another aspect, this invention relates to various compositions containing and varying uses for the hydrogenated polymers such as adhesives.

DESCRIPTION OF PREFERRED EMBODIMENTS

Figure 1:
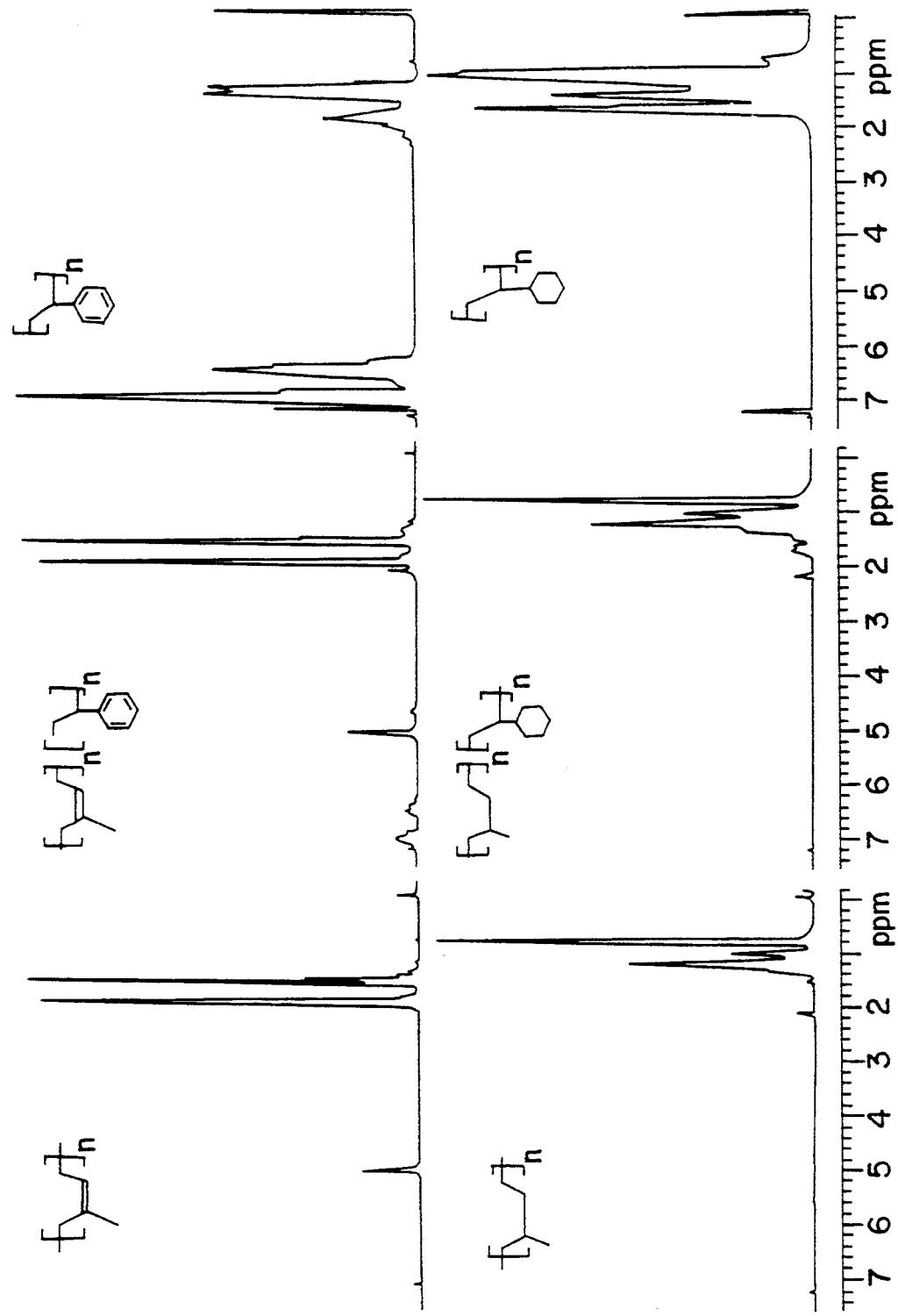
FIG. 1 is proton NMR spectra showing polystyrene polyisoprene diblock copolymer before and after hydrogenation. (hydrogenated polymer on the bottom)

This invention relates to a method for hydrogenating unsaturated polymers, preferably poly(alkenyl aromatic) homo- or copolymers or poly(alkenyl aromatic)-/polydiene block copolymers comprising contacting, under reaction conditions, the unsaturated polymer with a metal catalyst on an alkaline metal salt support and recovering the hydrogenated polymer having greater than 99.5% saturation and a molecular weight distribution of less than about 3.

This invention further relates to hydrogenated poly(alkenyl aromatic) homo- and copolymers and hydrogenated block copolymers comprising hydrogenated poly(alkenyl aromatic)/hydrogenated polydiene blocks having greater than about 99.5% unsaturation, preferably 99.75%, and a Mw/Mn of less than about 3, preferably less than about 2, even more preferably less than about 1.5.

In particular, this invention provides for hydrogenated poly(alkenyl aromatic), preferably hydrogenated polystyrene (also called poly(vinylcyclohexane), hydrogenated syndiotactic poly(alkenyl aromatic), preferably hydrogenated syndiotactic polystyrene, hydrogenated polystyrene/hydrogenated polydiene block copolymers, preferably hydrogenated (polystyrene-polyisoprene-polystyrene) block copolymers and hydrogenated (polystyrene-polybutadiene-polystyrene) block copolymers having greater than 99.5%, preferably 99.75%, unsaturation and a molecular weight distribution of less than about 3, preferably less than about 2, even more preferably less than about 1.5.

This invention further relates to adhesives comprising tackifiers, hydrogenated polymers of this invention and optional additives known to those of ordinary skill in the art.

For the purposes of this application and the claims appended thereto the term block copolymers is herein specifically defined to include diblocks, triblocks, multiblock, tapered block and star block copolymers, and the term copolymer is defined to mean polymers of two or more different monomers.

In a preferred embodiment the homo- and copolymers of the poly(alkenyl aromatic) include random, isotactic, syndiotactic and amorphous homopolymers and copolymers of any alkenyl aromatic hydrocarbon, preferably where the alkyl has 1–20 carbon atoms, even more preferably 2–8 carbon atoms, and the aromatic is mono or polycyclic and can be substituted or unsubstituted, preferably with one or more alkyls each independently containing 0 to 20 carbon atoms, even more preferably 0 to 8 carbon atoms. Preferred polymers include polystyrene, syndiotactic polystyrene, poly(-para alkylstyrene) & syndiotactic poly (para alkylstyrene) where the alkyl has 1 to 20 carbon atoms, preferably 1–8 carbon atoms, even more preferably 1 carbon atom.

Stereospecific alkenyl aromatic homo- and copolymers, particularly syndiotactic poly (alkenyl aromatic)s, even more particularly, syndiotactic polystyrenes, can be made by the processes disclosed in U.S. Pat. Nos. 4,924,018, 5,093,295, 5,070,160, JP 62158709-A (pub. Jul. 14, 1987), JP 04258645-A (pub. Sep. 14, 1992), EPA 423100-A (pub. Apr. 17, 1991) which are incorporated by reference herein.

The polydienes in the starting block copolymers can be any polydiene, preferably polymers of a $C_4$ to $C_{20}$ diene, preferably $C_4$ to $C_{10}$. Another preferred embodiment contains conjugated polyenes, conjugated dienes or alpha-omega dienes. It is known that when an alpha-omega diene or a conjugated diene is added to a growing polymer that it can be added by different mechanisms of addition. For example 1,4-butadiene can be added by 1,2 addition or by 1,4 addition. Depending on the final use of the hydrogenated block copolymer, varying amounts of differently added monomer will be desirable in the starting block copolymer. For example, in styrene/butadiene block copolymer applications where flexibility is of greater importance a significant amount of 1,2 added butadiene would be desirable since it hydrogenates to something like an ethylene/butene polymer. 1,4 added polybutene hydrogenates to something like ethylene polymer and would be much stiffer, and therefore would be preferable for applications requiring greater stiffness. It is within the scope of the invention that the polydiene block may comprise anywhere from 0 to 100% 1,2 added monomer and from 100% to 0% other forms of added monomer. For polybutene, up to 100% of the monomer may be added by 1,2 addition, preferably up to 75% The amount of monomer added by a particular form of addition may be influenced by the isomeric configuration of the monomer or by the catalyst used to make the blocks.

Examples of preferred polydienes include, but are not limited to, homopolymeric and copolymeric polymers of butadiene, pentadiene, hexadiene, heptadiene, octadiene, nonadiene, isobutadiene, isopentadiene, isohexadiene, isoheptadiene, isooctadiene and isoprene.

The poly(alkenyl aromatics) in the starting block copolymers may be polymers of any alkenyl aromatic hydrocarbons specifically alkyl aromatic hydrocarbons wherein the aromatic may either be monocyclic or polycyclic, substituted or unsubstituted, preferably with one or more alkyls having 0 to 20 carbon atoms, preferably 0 to 8 carbon atoms. and the alkyl has 1 to 20 carbons, preferably 2 to 8 carbons. Preferred species include styrene, methylstyrene, alpha methyl styrene, para methyl styrene, para dimethlstryene, butlystyrene, para t-butyl styrene, vinylxylene, ethylvinylxylene, isopropylstyrene, vinylnapthalene and the like.

The starting polymer may have any desirable weight average molecular weight, depending on the final application or use for the hydrogenated product. For example lubricants and additives typically have lower Mw's than do films, fibers, articles and the like. For high strength applications an Mw of at least about 50,000, preferably at least about 100,000, even more preferably, at least about 300,000, even more preferably at least about 400,000 is preferred.

These various starting polymers and block copolymers may be prepared by methods readily known to those of ordinary skill in the art or the block copolymers may be purchased from various suppliers such as Shell Oil Company.

The hydrogenation of these starting block copolymers may be conducted under the usual conditions known to experts in the art utilizing a wide variety of hydrogenation catalysts on an alkaline metal salt support. Preferred metal catalysts include those comprising metals selected from groups 3, 4, 5, 6 , 7, 8, 9, 10, 11 or 12 of the Periodic Table of Elements. All references to the periodic Table are to the Table as published in Chemical and Engineering News 63(5), 27, 1985. Transition metal catalysts are further preferred with gold, silver, palladium, platinum, rhenium, nickel, rhodium and chromium, being especially preferred. Examples of preferred catalysts include nickel, copper chromate, molybdenum sulfide, palladium, platinum oxide, copper chromium, oxide and the like.

The catalyst is preferably present in the reaction at a ratio of 0.01 to 10.0 g of catalyst per gram of polymer, preferably 2.0 to 4.0, even more preferably 2.0 to 5.0. Depending on the choice of catalyst, the catalyst may be reduced prior to the reaction by methods known in the art. The hydrogenation may take place in any reactor which can withstand the temperature and pressure conditions required above.

The catalyst support may be any alkaline metal salt, such as lithium, sodium, potassium, barium, calcium, magnesium or cesium salts, preferably barium or calcium salts, more preferably $BaSO_4$, $CaCO_3$, $BaCO_3$. The catalyst is placed on the support by methods known in the art. The choice of a particular support will be directed by considerations such as the temperature of the reaction, the alkaline metal salt selected and the metal catalyst chosen. For Example, when using a calcium carbonate support slightly higher reaction temperatures are desirable to achieve 99.5% or greater unsaturation while slightly lower temperatures may be used for barium sulfate supports and still achieve 99.5% or greater unsaturation. All the possible variations and reaction manipulations are within the skill of one of ordinary skill in the art to determine.

Hydrogenation pressures are preferably in the range from atmospheric to about 3000 psig, preferably between about 100 to about 1000 psig. The hydrogenation temperature can range from 25° C. to the degradation of the polymer although the maximum temperatures are preferably restricted to between 100° and 500° C., preferably 100° and 200° C. Reaction times may be as long as necessary to achieve 99.5% or greater hydrogenation. Preferably these times are in the range of 10 minutes to 124 hours or above, even more preferably 2 to 24 hours.

These reactions are preferably conducted in solution phase. Typical solvents are paraffins, isoparaffins, cycloparaffins, tetrahydrofuran and the like and mixtures thereof. Cyclohexanes, hexanes, tetrahydrofuran and mixtures thereof are preferred. Choice of solvent may be dictated by the starting polymer. For instance, a solvent that allows a greater radius of gyration is preferred over a solvent that allows only a small radius of gyration. For example, polystyrene in cyclohexane with up to about 10 wt % THF, preferably 5 to 10 wt %, has a greater radius of gyration than polystyrene in cyclohexane alone. The polystyrene in cyclohexane/THF solvent presents the unsaturations so that they are more accessible to the hydrogenation catalysts. Radius of gyration and related phenomena such as solubility parameters and theta solvents, are known parameters and can be measured or calculated by methods known in the art such as light scattering and the like.

The amount of catalyst required for hydrogenation is a function of the temperature of hydrogenation, of the degree of hydrogenation desired and within the skill of one of ordinary skill in the art to determine. The degree of saturation is proportional to the reaction temperature, catalyst concentration and mixing rate. Depending on the degree of saturation required and the polymer molecular weight all these variables can be adjusted to modify the reaction rate.

In a typical hydrogenation process an unsaturated polymer, preferably a poly(alkenyl aromatic) or a poly(alkenyl aromatic)/polydiene block copolymer is placed in a solvent, preferably a parraffinic solvent. The solution containing the catalyst is placed in a reactor which is pressured up to 3000 psi, preferably between 100 and 1000 psi, and heated up to 500° C., preferably 100° to 200° C. Depending on the catalyst chosen, the catalyst may be reduced in hydrogen for three hours at 100° C. and 100 psig prior to the reaction. The polymer solution is introduced into the reactor and stirred. A preferred catalyst is palladium supported on barium sulfate at a concentration of 2.0 to 5.0 grams, preferably 2.5 grams of catalyst per gram of polymer. The polymer catalyst mixture is then recovered from the reactor and filtered to remove catalyst particles. The hydrogenated polymer is then precipitated in methanol or the like, vacuum dried and stored in air at 0° C.

The degree of hydrogenation is determined from proton NMR (Varian VXR-300) measurements at 25° C. using 10% by weight polymer solutions in $CDCl_3$ with TMS as the internal reference. Upon hydrogenation the resonances associated with olefinic and aromatic protons are converted to aliphatic and cyclic protons. Thus the saturation efficiency can be measured by analyzing the remaining olefinic and aromatic proton resonances.

The hydrogenated polymers, preferably the hydrogenated block copolymers produced by this process may then be blended with one or more tackifiers and/or other additives for the formation of adhesives. In general, any hydrogenated tackifier will form adhesives with the polymers of this invention. Specific examples of hydrogenated tackifiers include ECR-111 produced by Exxon Chemical Company which is a hydrogenated aliphatic hydrocarbon resin with a Tg of about 35° C., ECR-327 and ECR-143-H which are hydrogenated liquid aliphatic tackifier resins with Tg's of $-14°$ C. and $-26°$ C. respectively. Tackifiers that are hydrogenated cyclics may also be utilized, however, hydrogenated linear or branched tackifiers are preferred. The tackifiers are preferably present at 50 phr, preferably 100 to 175 phr, even more preferably 100 to 150 phr, even more preferably 110 to 130 phr.

The adhesives can then be coated, laminated or applied onto a substrate, such as wood, paper, polyolefins, film, metal, paper, glass, ceramics and the like.

Other oils, plasticizers and processing aids may be added to the tackified composition as well. For example, antioxidants, such as Irganox 1010, fillers, thickeners, flow assist agents, silicon, oils, white mineral oil, low molecular weight polyolefins such as polybutene and chlorinated aromatics such as bisphenyls, and other additives known in the art can be added.

EXAMPLES

In the following Examples:
Molecular weight was measured by Gel Permeation Chromotography.

Viscoelastic properties (modulus, tensile strength, elongation at break) were determined using a rheometric solids analyzer (RSA2) operated in the dynamic mode ($0.01 < omega < 100$ rad/s with a 0.5 mm shear sandwich test fixture). Glass transition temperatures were determined by measuring G' at a fixed frequency. The Tg associated with the glassy component was determined by measuring G' at a fixed frequency (omega$_{ps-p}$-i$=0.08$ rads/s, omega$_{pvch-pep}=1$ rad/s) and 2% strain amplitude while slowly heating 1° C. per minutes the specimens in nitrogen. The order disorder transition temperature was measured by measuring G' at a fixed frequency and strained amplitude. Frequency equals 0.5 rads/s, 2% strain while slowly heating 1° C./min. Glass transition temperatures for the homopolymers and block copolymers were also determined by differential scanning calimetry (DSC) using a Perk and Elmer system DSC7. The 15 mg test specimens were heated from 60° to 200° C. at a rate of 10° C. per/min and hydrogenation was determined using the method described above. Gel permeation chromotgraphy (GPC) traces were obtained from a Waters 150c instrument fitted with phenoge columns operated at 25° C. with tetrahydrofuran as the mobil phase. Calibration was accomplished using monodisperse standards from Goodyear Chemical Co. (PI, PS-PI) and Pressure Chemical Co. (PS).

EXAMPLE 1

0.47 grams of polyisoprene-polystyrene block copolymer (25% PS) was dissolved in 60 ml of cyclohexane prepared in a purified argon environment and allowed to dissolve for 12 hours. The 2.5 grams of catalyst on $BaSO_4$ per gram of polymer was weighed out and placed in the clean hydrogenation reactor with a stir bar. The reactor was evacuated using a two stage vacuum pump, 15 psig of argon was slowly introduced into the reactor and then evacuated again after which the reactor was baked overnight at 115° C. The reactor was then filled with 100 psig hydrogen at a temperature of 100° C., reducing the catalyst for three hours. The 100 psig of hydrogen was evacuated and the polymer solution was introduced into the reactor slowly. 500 psig of hydrogen was slowly added to the reactor and was heated to 100° C. with stirring at a rate of 2000 rpm. The reaction was terminated after six hours and the reaction was depressurized. The polymer solution was removed and the catalyst particles were allowed to settle out of the polymer solution. The solution was filtered with a 0.45 micrometer filter, precipitated in methanol, vacuum dried and stored in air at 0° C. The Tg of the hydrogenated polystyrene polyisoprene block copolymer (PVCH-PEP) was measured to be 141° C. Other data are reported in table 1.

EXAMPLE 2

The procedure of example 1 was followed, except that the starting block copolymer was polystyrene 1,4-cisbutadiene. Greater than 99% unsaturation was achieved. Other data are reported in table 1.

EXAMPLE 3

A triblock copolymer of styrene-isoprene-styrene (19 wt. % styrene) was hydrogenated according to the procedure of example 1. Before hydrogenation, the block copolymer had an order disorder transition temperature ($T_{ODT}$) of 215° C. After hydrogenation the hydrogenated polymer had an order disorder of 245° C. Other data are reported in table 1.

TABLE 1

| Example | Wt % PS | Tg (DSC) (deg C.) | Mw | $T_{ODT}$ (deg C.) | % Sat. | Modulus (psi) | Tensile Str (psi) | % Elong @ break | Mw/Mn |
|---|---|---|---|---|---|---|---|---|---|
| 1 Before H2 | 25 | 101 | 100 k | >300 | | | | | 1.06 |
| 1 After H2 | 25 | 141 | 100 k | >300 | >99 | | | | |
| 2 Before H2 | 50 | | 14 k | 100 | | | | | 1.06 |
| 2 After H2 | 50 | | 14 k | 235 | >99 | | | | |
| 3 Before H2 | 19 | 120 | 120 k | 215 | | 180 | 1740 | 1650 | 1.06 |
| 3 After H2 | 19 | 130 | 120 k | 245 | >99 | 363 | 1547 | 800 | |

EXAMPLE 4

Various formulations of hydrogenated block copolymers with tackifiers and non-hydrogenated starting block copolymers with tackifiers were blended and then tested for adhesive properties. The table below describes the components and the adhesive properties.

TABLE 2

| FORMULATION, phr | | | | | | |
|---|---|---|---|---|---|---|
| Vector 4111 (SIS) | 100 | 100 | | | | |
| Escorez 1310 (S.P. 92C) | 100 | | | | 100 | |
| ECR-111 (S.P. 65C) | | 100 | 100 | | 120 | 100 |
| Kraton G 1657 | | | | 100 | | |
| H2 Vector 4111 (Ex 3) | | | 100 | | 100 | 100 |
| Tack Response | | | | | | |
| Quick Stick, lb./in. | 3.7 | 2.1 | 1.3 | 0.6 | 1.0 | 0.5 |
| Peel Strength, lb./in. | 4.8 | 3.2 | 2.7 | 1.8 | 1.7 | 1.7 |
| Cohesive Properties | | | | | | |
| Holding Power, Hrs. 1000 g. Weight 1" × 1" | 100+ | 100+ | 100+ | 100+ | 25 | 100+ |
| SAFT, °F. 1000 g. Weight 1" × 1" | 226 | 234 | 216 | 242 | 230 | 220 |

Vector 411 is a triblock (polystyrene-polyisoprene-polystyrene) block copolymer having 19 wt % styrene and an Mw of about 120,000.

Escorez 1310 is an aliphatic hydrocarbon rein with a MWD of 1.5 and an Mw of 1250 produced by Exxon Chemical Co. with a Tg of 36 degrees C.

ECR-111 is a hydrogenated aliphatic hydrocarbon resin with a Tg of about 30 degrees C. produced by Exxon Chemical Co.

Kraton G 1657 is a mixture of triblock (SBS) and diblock (SB) polymers with a saturated diene midblock with an $T_{ODT}$ between 200° and 230° C.

EXAMPLE 5

The procedure of Example 1 was used except the starting block copolymer was varied. The results and conditions are in Table 3.

TABLE 3

| POLYMER | WT % STYRENE | Mn | Mw/Mn | $T_{ODT}$ (°C.) |
|---|---|---|---|---|
| PS—PI | 0.5 | 18,000 | 1.06 | 124 |
| (PVCH—PEP) | 0.5 | 18,000 | 1.06 | 140 |
| PS-1,4PBD | 0.5 | 14,000 | 1.06 | 100 |
| (PVCH—PE) | 0.5 | 14,000 | 1.06 | 235 |
| PS-1,2PBD | 0.5 | 50,000 | 1.06 | >300 |
| (PVCH—PEE) | 0.5 | 50,000 | 1.06 | 230 |

As is apparent from the foregoing description, the materials prepared and the procedures followed relate to specific embodiments of the broad invention. It is apparent from the foregoing general description and the specific preferred embodiments that while forms of the invention have been illustrated and described, various modifications can be made without departing from the spirit and scope of this invention. Accordingly, it is not intended that the invention be limited thereby.

We claim:

1. A method for hydrogenating poly(alkenyl aromatic) polymers and poly(alkenyl aromatic)/polydiene block copolymers to at least 99.5% saturation, said method comprising:
   contacting under reaction conditions a poly(alkenyl aromatic) polymer or a poly(alkenyl aromatic)-/polydiene block copolymer, said polymers having a Mw of 100,000 or more, with a metal catalyst on an alkali metal salt or alkaline earth metal salt.

2. The method of claim 1 further comprising recovering a hydrogenated polymer having greater than 99.5% saturation and a Mw/Mn of less than about 3.

3. The method of claim 1 wherein the poly(alkenyl aromatic) polymer or the poly(alkenyl aromatic) block is a polymer or copolymer of styrene, para-methyl styrene, methylstyrene, dimethylstyrene, para-dimethylstyrene, butyl-styrene, t-butyl-styrene, vinylxylene, ethylvinylxylene, isopropylstyrene, vinylnapthalene, or a mixture thereof.

4. The method of claim 1, wherein the polydiene is a polymer of one or more conjugated dienes.

5. The method of claim 1, wherein the polydiene is a polymer of one or more $C_4$ to $C_{20}$ dienes.

6. The method of claim 1, wherein the polydiene is a polymer of one or more $C_4$ to $C_{10}$ dienes.

7. The method of claim 1, wherein the polydiene is polyisoprene or polybutadiene.

8. The method of claim 1, wherein the poly(alkenyl aromatic) polymer is syndiotactic.

9. The method of claim 8, wherein the syndiotactic poly(alkenyl aromatic) polymer is syndiotactic polystyrene.

10. The method of claim 1, wherein the catalyst metal is a transition metal.

11. The method of claim 1, wherein the catalyst metal is gold, silver, platinum, palladium, rhenium, nickel, rhodium or chromium.

12. The method of claim 1, wherein the support is a barium or calcium salt.

13. The method of claim 1, wherein the support is $BaSO_4$, $CaCO_3$ or $BaCO_3$.

14. The method of claim 2, wherein the hydrogenated polymer has greater than about 99.75% saturation.

* * * * *